US012122985B2

(12) United States Patent
Nagel et al.

(10) Patent No.: US 12,122,985 B2
(45) **Date of Patent: *Oct. 22, 2024**

(54) NON-AQUEOUS CLEANER FOR VEGETABLE OIL SOILS

(71) Applicant: ECOLAB USA INC., Saint Paul, MN (US)

(72) Inventors: Chris Nagel, Saint Paul, MN (US); Eric Victor Schmidt, Saint Paul, MN (US); Mark Levitt, Saint Paul, MN (US); Peter J. Fernholz, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/646,262

(22) Filed: Dec. 28, 2021

(65) Prior Publication Data

US 2022/0127550 A1 Apr. 28, 2022

Related U.S. Application Data

(60) Continuation of application No. 16/742,047, filed on Jan. 14, 2020, now Pat. No. 11,242,500, which is a (Continued)

(51) Int. Cl.
*C11D 3/00* (2006.01)
*B08B 3/00* (2006.01)
(Continued)

(52) U.S. Cl.
CPC ................ *C11D 3/43* (2013.01); *B08B 3/003* (2013.01); *B08B 3/08* (2013.01); *C11D 3/2093* (2013.01);
(Continued)

(58) Field of Classification Search
CPC ........ C11D 3/43; C11D 3/3209; C11D 3/2093
See application file for complete search history.

(56) References Cited

U.S. PATENT DOCUMENTS 4,261,842 A 4/1981 Busch et al.
6,096,699 A * 8/2000 Bergemann ............. C09D 9/04 510/505

(Continued)

FOREIGN PATENT DOCUMENTS

WO 0236531 A2 5/2002

OTHER PUBLICATIONS

The International Search Report and Written Opinion of the International Searching Authority, in connection to PCT/US2017/058737, filed Oct. 27, 2017, mailed Feb. 5, 2018.

*Primary Examiner* — Necholus Ogden, Jr.
(74) *Attorney, Agent, or Firm* — McKee, Voorhees & Sease, PLC

(57) ABSTRACT

The invention discloses cleaning compositions which employ a synergistic combination of an ester solvent, preferably a fatty acid methyl ester in combination with one or more linear alkyl amines. The alkyl amines act as to remove and suspend organic oils which have been burnt or adhered to a surface with heat and may even be used alone as a soil removal agent. The cleaning compositions have particular use in cleaning of distillation towers associated with biofuel, and vegetable oil refining, but also find use in cleaning ovens, food cooking surfaces and even dry cleaning.

17 Claims, 2 Drawing Sheets

Related U.S. Application Data division of application No. 15/346,428, filed on Nov. 8, 2016, now Pat. No. 10,577,571.

(51) Int. Cl.

| | |
|---|---|
| ***B08B 3/08*** | (2006.01) |
| ***C11D 3/20*** | (2006.01) |
| ***C11D 3/43*** | (2006.01) |
| ***C11D 7/26*** | (2006.01) |
| ***C11D 7/32*** | (2006.01) |

(52) U.S. Cl.

CPC ............ *C11D 7/266* (2013.01); *C11D 7/3209* (2013.01); *C11D 2111/12* (2024.01); *C11D 2111/14* (2024.01)

(56) References Cited

U.S. PATENT DOCUMENTS

| | | | | |
|---|---|---|---|---|
| 6,172,028 | B1 * | 1/2001 | Baur | C11D 7/08<br>510/499 |
| 7,250,391 | B2 | 7/2007 | Kanno et al. | |
| 2003/0036495 | A1 | 2/2003 | Datta | |
| 2011/0281436 | A1 * | 11/2011 | Inaba | C11D 7/5004<br>257/E21.218 |
| 2012/0214724 | A1 | 8/2012 | Scheibel et al. | |
| 2016/0177216 | A1 | 6/2016 | Lancon et al. | |
| 2016/0251590 | A1 | 9/2016 | Lundgren | |
| 2016/0312162 | A1 | 10/2016 | Cui | |
| 2017/0145345 | A1 * | 5/2017 | Gonzales | C11D 17/0043 |

* cited by examiner

NON-AQUEOUS CLEANER FOR VEGETABLE OIL SOILS

CROSS-REFERENCE TO RELATED APPLICATIONS

This application is a continuation application of U.S. Ser. No. 16/742,047, filed on Jan. 14, 2020, which is a divisional of application U.S. Ser. No. 15/346,428, filed on Nov. 8, 2016, now U.S. Pat. No. 10,577,571, issued on Mar. 3, 2020, which are herein incorporated by reference in their entirety.

FIELD OF THE INVENTION

The invention relates to non-aqueous cleaning compositions which potentiate the activity of green solvents for removal of oil based soils which can foul distillation systems in the processing of grains, oils, biofuels and sugars.

BACKGROUND OF THE INVENTION

Vegetable oil is one of the most important primary foods. Current production of edible soybean oil in the United States is approximately 9.5 billion pounds. A typical refinery for food production requires the oil to be degummed, deacidified, bleached and deodorized. Production of refined oil can also be used as biodiesel feedstock.

Two processes have been used in refining vegetable oils and fats; chemical refining and physical refining. The decision as to which process is to be used depends on the type and quality of crude oil to be processed. Chemical refining requires less capital cost than physical refining, where the free fatty acids of the crude oils are neutralized with caustic soda. The resulting sodium soaps or soapstocks are separated by using centrifugal separators. The neutral oils are subsequently bleached and deodorized. In physical refining, the free fatty acids are removed by distillation in one stage during deodorizing. A fundamental criteria for using this method is that the crude oil be degummed as effectively as possible. This method does not produce soapstocks and thus does not require the costly soapstock splitting process. Whichever process is used, distillation is a critical step.

Distillation removes free fatty acids from the vegetable oils. During distillation, live steam is passed through the vegetable oil while it is maintained under a high vacuum and at elevated temperatures. The temperature usually ranges from 460° to 530° F. and the vacuum is maintained at 4 to 6 min. Hg. The process may require from one and a half to seven hour. During the process most of the free fatly acids remaining in the vegetable oil are distilled off. Most of the remaining pigment products are destroyed during this step as well. The acid value and color of the oil are thus improved, and the odor and flavor are made acceptable.

Over time these distillation systems become fouled and need to be cleaned several times per year. The typical cleaning method involves an extended shutdown of the system for manual scraping. In addition to complete shutdown of the refinery, manual scraping requires confined space entry and its associated hazards. Sometimes biodiesel is then flushed through the system to remove residual soils, usually with unsatisfactory results. Other cleaning methods include use of aqueous solutions. While these can be effective, it takes a considerable amount of time to evacuate all the water out of the system before re-starting production. Any water left in the system can heat and pose a fire hazard.

As can be seen, there is a need in the art for an effective non-aqueous cleaner that can reduce manual labor, improve safety, reduce downtime and consequently increase production time and throughput.

SUMMARY OF THE INVENTION

The invention discloses cleaning compositions that are non-aqueous and include a ester as a green solvent (preferably a fatty acid ester solvent, more preferably a fatty acid methyl ester solvent) in combination with an alkyl amine compound which acts as an adjuvant. Applicants screened over 130 different classes of compounds before identifying the adjuvant properties of the fatty amines in combination with the ester solvents. The combination can be used to remove oily soils from a number of hard surfaces, particularly those involved in processing of oils, grains, biofuels and sugars where the oily soils become adhered to the surface with high heat. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tong oil, jatropha oil, mustard oil, pennycress oil, camelina oil, and castor oil. The compositions of the invention can also be used to remove baked on oily soils that are burnt on grills, hoods and floors or even in dry cleaning applications. The compositions can be used as a pretreatment, a cleaning composition for standard periodic cleaning, or as a cleaning booster in combination with other standard cleaners.

According to the invention the cleaning composition includes an ester solvent as a carrier. In a preferred embodiment the ester is a fatty acid ester, and in a more preferred embodiment the fatty acid ester is a fatty acid methyl ester solvent. The ester solvent can be saturated or unsaturated with a carbon chain length of C8 to C18, preferably C12, C16, or C18.

The alkyl amine component can, in some embodiments be used alone as the cleaning agent which is then rinsed away with a solvent, preferably the ester solvent. The composition includes one or more amines that are soluble with the fatty acid methyl ester. These include nonbranched primary alkyl amines that are preferably linear and have a carbon chain length of C4 or higher. In certain embodiments the composition can also include a second amine. In some embodiments the amine is a branched amine. This group of fatty amines does not include alkanolamines, or amines with hydroxyl functional groups, or ethylamines or, triamines amines which are volatile and flammable. The alkyl amine component can comprise up to about 25 wt. % of the composition with the remainder being the ester solvent (fatty acid methyl ester) (up to 90 wt. %) with any remainder comprising a carrier and/or other functional components.

DETAILED DESCRIPTION OF THE INVENTION

Figure 1:
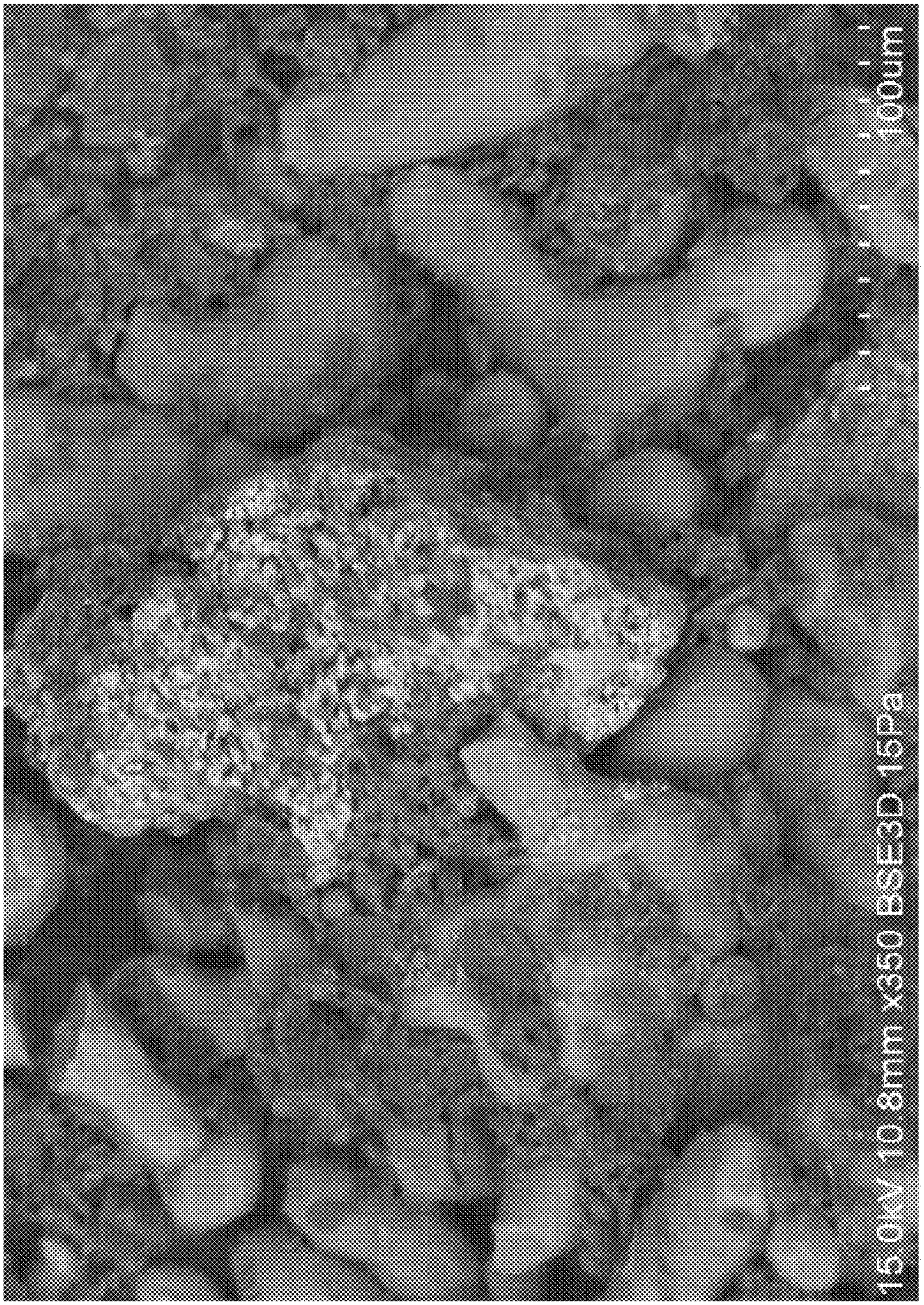
FIG. 1 is a scanning electron micrograph of soil before cleaning with the compositions of the invention.

So that the invention maybe more readily understood, certain terms are first defined and certain test methods are described.

As used herein, the term "about" refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "surfactant" as used herein is a compound that contains a lipophilic segment and a hydrophilic segment, which when added to water or solvents, reduces the surface tension of the system.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

The term "hard surface" refers to a solid, substantially non-flexible surface such as a counter top, tile, floor, wall, panel, window, plumbing fixture, kitchen and bathroom furniture, appliance, engine, circuit board, and dish.

The term "soft surface" refers to a softer, highly flexible material such as fabric, carpet, hair, and skin.

As used herein, the term "cleaning" refers to a method used to facilitate or aid in soil removal, bleaching, microbial population reduction, and any combination thereof "Soil" or "stain" refers to a non-polar oily substance which may or may not contain particulate matter such as mineral clays, sand, natural mineral matter, carbon black, graphite, kaolin, environmental dust, etc.

As used herein, "weight percent," "wt-%," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt-%," etc.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the term "-free" or "substantially-free" when referring to a particular element or component refers to a composition, mixture, or ingredient that does not contain the element or component or to which the element of component has not been added. Should the component or element be present through contamination, the amount of the same shall be less than 0.5 wt %. More preferably, the amount of phosphorus is less than 0.1 wt-%, and most preferably less than 0.01 wt %.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Cleaning Compositions

Cleaning compositions of the can be used to help remove any of a number of vegetable and biobased oils that are adhered to a surface with heat. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, camelina oil, and castor oil. The compositions of the invention can also be used to remove baked on oily soils that are burnt on grills, hoods and floors or even in dry cleaning applications. The compositions can be used as a preatment, a cleaning composition for standard periodic cleaning, or as a cleaning booster in combination with other standard cleaners.

According to the invention the cleaning composition includes form about 50 wt. % to about 98 wt. %; preferably from about 60 wt. % to about 95 wt. % and more preferably from about 70 wt. % to about 80 wt. % of an ester solvent, preferably a fatty acid ester solvent and more preferably a fatty acid methyl ester. The ester can be saturated or unsaturated with a carbon chain length of C8 to C18, preferably C12, C16, or C18.

The alkyl amine component includes one or more amines that are soluble with the fatty acid methyl ester. The cleaning composition includes form about 2 wt. % to about 40 wt. %; preferably from about 5 wt. % to about 30 wt. % and more preferably from about 10 wt. % to about 25 wt. % of a soluble fatty amine. Alkyl amines useful include non-branched primary amines that are preferably linear and have a carbon chain length of C4 or higher. In certain embodiments the composition can also include a second amine, which may be a branched amine. The alkyl amine component can comprise up to about 25 wt. % of the composition with the remainder being the fatty acid methyl ester (up to 90 wt. %) with any remainder comprising a carrier and/or other functional components.

Ester Solvent

The invention includes up to 90% of the composition is an ester solvent. These can be saturated or unsaturated. The ester solvent is carboxylate ester which is a liquid with a carbon chain length of C8 or higher. In a preferred embodiment the ester solvent is a fatty acid ester solvent and in a more preferred embodiment the solvent is a fatty acid methyl ester solvent.

The ester solvent is preferably a C8 or C9, although lengths up to C16 and C18 can be used. Fatty methyl esters possess solvent-like properties on greasy soils, and assist in lifting the grease or soil from a surface so that the surfactants (if present in the cleaning composition) can more easily emulsify the soil particles. Methyl oleate is a preferred fatty acid methyl ester.

Suitable fatty acid methyl esters include, but are not limited to, compounds having the formula $RCO_2CH_3$ wherein R may be a branched or an unbranched, saturated or unsaturated aliphatic group having from 3 to 30 carbon atoms. More particularly the R group may have from 8 to 22 carbon atoms. Examples of fatty acid methyl esters include, but are not limited to, methyl laurate (R=C11), methyl myristate (R=C13), methyl palmitate (R=C15), methyl stearate (R=C17), methyl oleate (R=C17; monounsaturated), methyl linolenate (R=C17; polyunsaturated), methyl behenate (R=C21), and methyl cerotate (R=C25). Examples of commercially available fatty acid methyl esters include the following: SOYGOLD® marketed by AG Environmental Products L.L.C.; SOYsolv® and SOYsolvII® marketed by SOYsolve Industrial Products; and soy methyl esters marketed by Columbus. A mixture of fatty acid methyl esters may also be used. In one embodiment, the R group may have from about 16 to about 18 carbon atoms.

Alkyl Amines

A alkyl amine is any amine attached to a hydrocarbon chain. These compounds are classified as oleochemicals. They are often mixtures. Commercially important members include coco amine, oleylamine, tallow amine, and soya amine. Alkyl amines are commonly prepared from fatty acids; which are themselves obtained from natural sources, typically seed-oils. The overall reaction begins between the fatty acid and ammonia at high temperature (>250° C.) and in the presence of a metal oxide catalyst (e.g., alumina or zinc oxide) to give the fatty nitrile.

$$RCOOH+NH_3 \rightarrow RC\equiv N+2H_2O$$

The alkyl amine is obtained from this by hydrogenation with any of a number of reagents, including Raney nickel or cobalt, and copper chromite catalysts. When conducted in the presence of excess ammonia the hydrogenation affords the primary amines.

$$RCN+2H_2 \rightarrow RCH_2NH_2$$

In the absence of ammonia, secondary and tertiary amines are produced.

$$2RCN+4H_2 \rightarrow (RCH_2)_2NH+NH_3$$

$$3RCN+6H_2 \rightarrow (RCH_2)_3N+2NH_3$$

The composition includes up to 25% of an adjuvant of one or more alkyl amines that are soluble in the fatty acid methyl ester. The amine is preferably a primary amine and more preferably a linear primary amine. In certain embodiments the composition can also include a second amine in addition to the primary amine. The second amine can be linear or branched and can be up to about 10 wt % of the composition. In a preferred embodiment the amine is a primary amine, and even more preferred is an amine with a C4 or longer.

The composition does not include alkanolamines, (not soluble), or amines with a hydroxyl functional group.

Examples of suitable alkyl amines include N-methylpyrrolidone, octamethylenediamine, octylamine, ortho-phenolenediamine, PPD paraphenolenediamine, tetramethylethylenediamine, tridecylamine, triethanolmine, 1,2 propanediamine, 2-(2-aminoethoxy)ethanol, 2-ethylhexylamine, ammonia, AMP 95 2-amino 2-methyl propanol, butyl amine, cocamide DEA, diethanolamine, diglycolamine, dimethyl formamide, dipropylamine, dipropylamine tetramine, dodecyl amine, ethylene diamine, ethylene diamine, hexyloxypropylamine, imidazole, monoethanolamine, monoisopropyl amine, methoxypropylamine, morpholine, and N, N-Dimethyl 9-decenamide.

Carrier

In some embodiments, the compositions of the present invention include a carrier. The carrier provides a medium which dissolves, suspends, or carries the other components of the composition. For example, the carrier can provide a medium for solubilization, suspension, or production of composition and for forming an equilibrium mixture. The carrier can also function to deliver and wet the composition of the invention on an object. To this end, the carrier can contain any component or components that can facilitate these functions.

In some embodiments, the carrier according to the invention does not include water. The carrier can include or be primarily an organic solvent, such as simple alkyl alcohols, e.g., ethanol, isopropanol, n-propanol, benzyl alcohol, and the like. Polyols are also useful carriers, including glycerol, sorbitol, and the like.

Suitable carriers include glycol ethers. Suitable glycol ethers include diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether (commercially available as DOWANOL EPH from Dow Chemical Co.), propylene glycol phenyl ether (commercially available as DOWANOL PPH from Dow Chemical Co.), and the like, or mixtures thereof. Additional suitable commercially available glycol ethers (all of which are available from Union Carbide Corp.) include Butoxyethyl PROPASOL™, Butyl CARBITOL™ acetate, Butyl CARBITOL™, Butyl CELLOSOLVE™ acetate, Butyl CELLOSOLVE™, Butyl DIPROPASOL™, Butyl PROPASOL™, CARBITOL™ PM-600, CARBITOL™ Low Gravity, CELLOSOLVE™ acetate, CELLOSOLVE™, Ester EEP™, FILMER IBT™, Hexyl CARBITOL™, Hexyl CELLOSOLVE™, Methyl CARBITOL™, Methyl CELLOSOLVE™ acetate, Methyl CELLOSOLVE™, Methyl DIPROPASOL™ Methyl PROPASOL™ acetate, Methyl PROPASOL™, Propyl CARBITOL™, Propyl CELLOSOLVE™, Propyl DIPROPASOL™ and Propyl PROPASOL™.

In some embodiments, the carrier makes up a large portion of the composition of the invention and may be the balance of the composition apart from the alkyl amine and fatty acid methyl ester, and the like. The carrier concentration and type will depend upon the nature of the composition as a whole, the environmental storage, and method of application including concentration of the sulfonated peroxycarboxylic acid, among other factors. Notably the carrier should be chosen and used at a concentration which does not inhibit the efficacy of the sulfonated peroxycarboxylic acid in the composition of the invention for the intended use, e.g., bleaching, sanitizing, disinfecting. In certain embodiments, the present composition includes about 5 to about 90 wt-% carrier, about 10 to about 80 wt % carrier, about 20 to about 60 wt % carrier, or about 30 to about 40 wt % carrier. It is to be understood that all values and ranges between these values and ranges are encompassed by the present invention.

Additional Components

While not essential for the purposes of the present invention, the non-limiting list of additional components illustrated hereinafter are suitable for use in the instant compositions and may be desirably incorporated in certain embodiments of the invention, for example to assist or enhance cleaning performance, for treatment of the substrate to be cleaned, or to modify the aesthetics of the cleaning composition as is the case with perfumes, colorants, dyes or the like. The precise nature of these additional components, and levels of incorporation thereof, will depend on the physical form of the composition and the nature of the cleaning operation for which it is to be used. Suitable additional materials include, but are not limited to, surfactants, builders, chelating agents, viscosity modifiers, dispersants, enzymes, and enzyme stabilizers, catalytic materials, bleaches, bleach activators, hydrogen peroxide, threshold inhibitors for hard water precipitation, pigments, dyes, perfumes, structure elasticizing agents, hydrotropes, processing aids, additional solvents, pigments, cleaning compositions, pH buffers, and mixtures thereof. In addition to the disclosure below, suitable examples of such other adjuncts and levels of use are found in U.S. Pat. Nos. 5,576,282, 6,306,812 B1 and 6,326,348 B1 that are incorporated by reference.

As stated, the adjunct ingredients are not essential to Applicants' compositions. Thus, certain embodiments of Applicants' compositions do not contain additional materials. However, when one or more additional materials are present, such one or more additional components may be present as detailed below.

Surfactants

In some embodiments, the compositions of the present invention include a surfactant. Surfactants suitable for use with the compositions of the present invention include, but are not limited to, nonionic surfactants, anionic surfactants, and zwitterionic surfactants. In some embodiments, the compositions of the present invention include about 10 wt % to about 50 wt % of a surfactant. In other embodiments the compositions of the present invention include about 15 wt % to about 30% of a surfactant. In still yet other embodiments, the compositions of the present invention include about 25 wt % of a surfactant. In some embodiments, the compositions of the present invention include about 100 ppm to about 1000 ppm of a surfactant.

Nonionic Surfactants

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-$(EO)_5(PO)_4$) and Dehypon LS-36 (R-$(EO)_3(PO)_6$); and capped alcohol alkoxylates, such as Plurafac LF221 and Tegoten EC11; mixtures thereof, or the like.

Semi-Polar Nonionic Surfactants

The semi-polar type of nonionic surface active agents are another class of nonionic surfactant useful in compositions of the present invention. Semi-polar nonionic surfactants include the amine oxides, phosphine oxides, sulfoxides and their alkoxylated derivatives.

Amine oxides are tertiary amine oxides corresponding to the general formula:

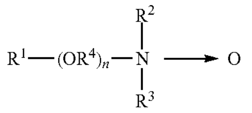

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of cleaning composition interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide.

Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)

amine oxide, 3,6,9-trioctadecyldimethylamine oxide and 3-dodecoxy-2-hydroxypropyldi-(2-hydroxyethyl)amine oxide.

Anionic Surfactants

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

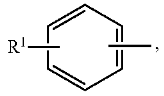, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

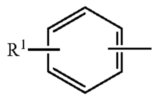

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989). The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

(MONO)ACETATE (DI)PROPIONATE

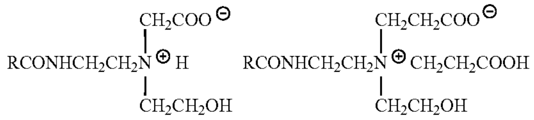

Neutral pH - Zwitterion

-continued

AMPHOTERIC SULFONATE

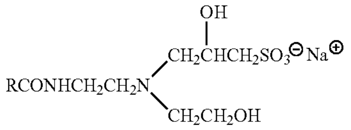

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which R═$C_8$-$C_{18}$ straight or branched chain alkyl, alkyl amines with halogenated carboxylic acids. Alkylation of the primary amino groups of an amino acid leads to secondary and tertiary amines. Alkyl substituents may have additional amino groups that provide more than one reactive nitrogen center. Most commercial N-alkyl amine acids are alkyl derivatives of beta-alanine or beta-N (2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—N+($CH_2$—$CH_2$—$CO_2Na$)$_2$—$CH_2$—$CH_2$—OH or $C_{12}$-alkyl-C(O)—N(H)—$CH_2$—$CH_2$—N+($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Cleaning compositions" (Vol. I and II by Schwartz, Perry and Berch).

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants for use herein.

A general formula for these compounds is:

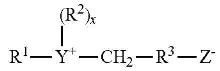

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said cleaning composition surfactants can be straight or branched and saturated or unsaturated.

The zwitterionic surfactant suitable for use in the present compositions includes a betaine of the general structure:

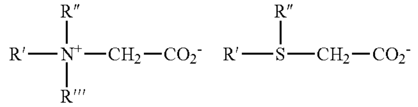

-continued

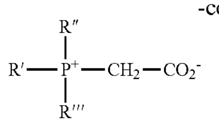

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+ R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Cleaning compositions" (Vol. I and II by Schwartz, Perry and Berch).

In an embodiment, the compositions of the present invention include a betaine. For example, the compositions can include cocoamidopropyl betaine.

Bleaching Agents

The cleaning compositions of the present invention may comprise one or more bleaching agents. Suitable bleaching agents other than bleaching catalysts include photobleaches, bleach activators, hydrogen peroxide, sources of hydrogen peroxide, preformed peracids and mixtures thereof. In general, when a bleaching agent is used, the compositions of the present invention may comprise from about 0.1% to about 50% or even from about 0.1% to about 25% bleaching agent by weight of the subject cleaning composition. Examples of suitable bleaching agents include:

(1) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C—O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen; (2) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicat, carbonate or borate salts or mixtures thereof, or organic materials such as water-soluble or dispersible polymers, waxes, oils or fatty soaps; and (3) bleach activators having R—(C—O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Builders

The cleaning compositions of the present invention may comprise one or more builders or builder systems. When a builder is used, the subject composition will typically comprise at least about 1%, from about 5% to about 60% or even from about 10% to about 40% builder by weight of the subject composition. The cleaning composition may contain an inorganic or organic builder which counteracts the effects of calcium, or other ion, water hardness. Examples include the alkali metal citrates, succinates, malonates, carboxymethyl succinates, carboxylates, polycarboxylates and polyacetyl carboxylate; or sodium, potassium and lithium salts of oxydisuccinic acid, mellitic acid, benzene polycarboxylic acids, and citric acid; or citric acid and citrate salts. Organic phosphonate type sequestering agents such as DEQUEST® by Monsanto and alkanehydroxy phosphonates are useful. Other organic builders include higher molecular weight polymers and copolymers, e.g., polyacrylic acid, polymaleic acid, and polyacrylic/polymaleic acid copolymers and their salts, such as SOKALAN® by BASF. Generally, the builder may be up to 30%, or from about 1% to about 20%, or from abut 3% to about 10%.

The compositions may also contain from about 0.01% to about 10%, or from about 2% to about 7%, or from about 3% to about 5% of a $C_{8-20}$ fatty acid as a builder. The fatty acid can also contain from about 1 to about 10 EO units. Suitable fatty acids are saturated and/or unsaturated and can be obtained from natural sources such a plant or animal esters (e.g., palm kernel oil, palm oil, coconut oil, babassu oil, safflower oil, tall oil, tallow and fish oils, grease, and mixtures thereof), or synthetically prepared (e.g., via the oxidation of petroleum or by hydrogenation of carbon monoxide via the Fisher Tropsch process). Useful fatty acids are saturated $C_{12}$ fatty acid, saturated $C_{12-14}$ fatty acids, saturated or unsaturated $C_{12-18}$ fatty acids, and a mixture thereof. Examples of suitable saturated fatty acids include captic, lauric, myristic, palmitic, stearic, arachidic and behenic acid. Suitable unsaturated fatty acids include: palmitoleic, oleic, linoleic, linolenic and ricinoleic acid.

Chelating Agents

The cleaning compositions herein may contain a chelating agent. Suitable chelating agents include copper, iron and/or manganese chelating agents and mixtures thereof. When a chelating agent is used, the subject composition may comprise from about 0.005% to about 15% or even from about 3.0% to about 10% chelating agent by weight of the subject composition.

Dispersants

The compositions of the present invention can also contain dispersants. Suitable water-soluble organic materials include the homo- or co-polymeric acids or their salts, in which the polycarboxylic acid comprises at least two carboxyl radicals separated from each other by not more than two carbon atoms.

Enzymes

The cleaning compositions can comprise one or more enzymes which provide cleaning performance. Enzymes can be included herein for a wide variety of fabric laundering purposes, including removal of protein-based, carbohydrate-based, or triglyceride-based stains. Examples of suitable enzymes include, but are not limited to, hemicellulases, peroxidases, proteases, cellulases, xylanases, lipases, phospholipases, esterases, cutinases, pectinases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, amylases, or combinations thereof and may be of any suitable origin. The choice of enzyme(s) takes into account factors such as pH-activity, stability optima, thermostability, stability versus active chelants, builders, etc. A detersive enzyme mixture useful herein is a protease, lipase, cutinase and/or cellulase in conjunction with amylase. Sample detersive enzymes are described in U.S. Pat. No. 6,579,839.

Enzymes are normally present at up to about 5 mg, more typically from about 0.01 mg to about 3 mg by weight of active enzyme per gram of the cleaning composition. Stated another way, the cleaning composition herein will typically contain from about 0.001% to about 5%, or from about 0.01% to about 2%, or from about 0.05% to about 1% by weight of a commercial enzyme preparation. Protease enzymes are present at from about 0.005 to about 0.1 AU of activity per gram of cleaning composition. Proteases useful herein include those like subtilisins from *Bacillus* [e.g. *subtilis, lentus, licheniformis, amyloliquefaciens* (BPN, BPN'), *alcalophilus*,] e.g. Esperase®, Alcalase®, Everlase® and Savinase® (Novozymes), BLAP and variants (Henkel). Further proteases are described in EP 130756, WO 91/06637, WO 95/10591 and WO 99/20726.

Amylases are described in GB Pat. #1 296 839, WO 94/02597 and WO 96/23873; and available as Purafect Ox Am® (Genencor), Termamyl®, Natalase®, Ban®, Fungamyl®, Duramyl® (all Novozymes), and RAPIDASE (International Bio-Synthetics, Inc).

The cellulase herein includes bacterial and/or fungal cellulases with a pH optimum between 5 and 9.5. Suitable cellulases are disclosed in U.S. Pat. No. 4,435,307 to Barbesgoard, et al., issued Mar. 6, 1984. Cellulases useful herein include bacterial or fungal cellulases, e.g. produced by *Humicola insolens*, particularly DSM 1800, e.g. 50 kD and ~43 kD (Carezyyme®). Additional suitable cellulases are the EGIII cellulases from *Trichoderma longibrachiatum*. WO 02/099091 by Novozymes describes an enzyme exhibiting endo-beta-glucanase activity (EC 3.2.1.4) endogenous to *Bacillus* sp., DSM 12648; for use in cleaning composition and textile applications; and an anti-redeposition endo-glucanase in WO 04/053039. Kao's EP 265 832 describes alkaline cellulase K, CMCase I and CMCase II isolated from a culture product of *Bacillus* sp KSM-635. Kao further describes in EP 1 350 843 (KSM 5237; 1139; KSM 64; KSM N131), EP 265 832A (KSM 635, FERM BP 1485) and EP 0 271 044 A (KSM 534, FERM BP 1508; KSM 539, FERM BP 1509; KSM 577, FERM BP 1510; KSM 521, FERM BP 1507; KSM 580, FERM BP 1511; KSM 588, FERM BP 1513; KSM 597, FERM BP 1514; KSM 522, FERM BP 1512; KSM 3445, FERM BP 1506; KSM 425. FERM BP 1505) readily-mass producible and high activity alkaline cellulases/endoglucanases for an alkaline environment. Such endo-glucanase may contain a polypeptide (or variant thereof) endogenous to one of the above *Bacillus* species. Other suitable cellulases are Family 44 Glycosyl Hydrolase enzymes exhibiting endo-beta-1,4-glucanase activity from Paenibacilus polyxyma (wild-type) such as XYG1006 described in WO 01/062903 or variants thereof. Carbohydrases useful herein include e.g. mannanase (see, e.g., U.S. Pat. No. 6,060,299), pectate lyase (see, e.g., WO99/27083), cyclomaltodextrin glucanotransferase (see, e.g., WO96/33267), and/or xyloglucanase (see, e.g., WO99/02663). Bleaching enzymes useful herein with enhancers include e.g. peroxidases, laccases, oxygenases, lipoxygenase (see, e.g., WO 95/26393), and/or (non-heme) haloperoxidases.

Suitable endoglucanases include: 1) An enzyme exhibiting endo-beta-1,4-glucanase activity (E.C. 3.2.1.4), with a sequence at least 90%, or at least 94%, or at least 97% or at least 99%, or 100% identity to the amino acid sequence of positions 1-773 of SEQ ID NO:2 in WO 02/099091; or a fragment thereof that has endo-beta-1,4-glucanase activity. GAP in the GCG program determines identity using a GAP creation penalty of 3.0 and GAP extension penalty of 0.1. See WO 02/099091 by Novozymes A/S on Dec. 12, 2002, e.g., Celluclean™ by Novozymes A/S. GCG refers to sequence analysis software package (Accelrys, San Diego, Calif., USA). GCG includes a program called GAP which uses the Needleman and Wunsch algorithm to find the alignment of two complete sequences that maximizes the number of matches and minimizes the number of gaps; and 2) Alkaline endoglucanase enzymes described in EP 1 350 843A published by Kao on Oct. 8, 2003 ([0011]-[0039] and examples 1-4).

Suitable lipases include those produced by *Pseudomonas* and Chromobacter, and LIPOLASE®, LIPOLASE ULTRA®, LIPOPRIME® and LIPEX® from Novozymes. See also Japanese Patent Application 53-20487, laid open on Feb. 24, 1978, available from Areario Pharmaceutical Co. Ltd., Nagoya, Japan, under the trade name Lipase P "Amano". Other commercial lipases include Amano-CES, lipases ex Chromobacter viscosum, available from Toyo Jozo Co., Tagata, Japan; and Chromobacter viscosum lipases from U.S. Biochemical Corp., U.S.A. and Diosynth Co., The Netherlands, and lipases ex *Pseudomonas gladioli*. Also suitable are cutinases [EC 3.1.1.50] and esterases.

Enzymes useful for liquid cleaning composition formulations, and their incorporation into such formulations, are disclosed in U.S. Pat. No. 4,261,868 to Hora, et al., issued Apr. 14, 1981. In an embodiment, the liquid composition herein is substantially free of (i.e. contains no measurable amount of) wild-type protease enzymes. A typical combination is an enzyme cocktail that may comprise, for example, a protease and lipase in conjunction with amylase.

When present in a cleaning composition, the aforementioned additional enzymes may be present at levels from about 0.00001% to about 2%, from about 0.0001% to about 1% or even from about 0.001% to about 0.5% enzyme protein by weight of the composition.

Enzyme Stabilizers

Enzymes for use in cleaning compositions can be stabilized by various techniques. The enzymes employed herein can be stabilized by the presence of water-soluble sources of calcium and/or magnesium ions in the finished compositions that provide such ions to the enzymes. In case of aqueous compositions comprising protease, a reversible protease inhibitor, such as a boron compound, can be added to further improve stability.

A useful enzyme stabilizer system is a calcium and/or magnesium compound, boron compounds and substituted boric acids, aromatic borate esters, peptides and peptide derivatives, polyols, low molecular weight carboxylates, relatively hydrophobic organic compounds [e.g. certain esters, diakyl glycol ethers, alcohols or alcohol alkoxylates], alkyl ether carboxylate in addition to a calcium ion source, benzamidine hypochlorite, lower aliphatic alcohols and carboxylic acids, N,N-bis(carboxymethyl) serine salts; (meth) acrylic acid-(meth)acrylic acid ester copolymer and PEG; lignin compound, polyamide oligomer, glycolic acid or its salts; poly hexa methylene bi guanide or N,N-bis-3-amino-propyl-dodecyl amine or salt; and mixtures thereof. The cleaning composition may contain a reversible protease inhibitor e.g., peptide or protein type, or a modified subtilisin inhibitor of family VI and the plasminostrepin; leupeptin, peptide trifluoromethyl ketone, or a peptide aldehyde. Enzyme stabilizers are present from about 1 to about 30, or from about 2 to about 20, or from about 5 to about 15, or from about 8 to about 12, millimoles of stabilizer ions per liter.

Catalytic Metal Complexes—Applicants' cleaning compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936; 5,595,967. Such cobalt catalysts are readily prepared by known procedures, such as taught for example in U.S. Pat. Nos. 5,597,936, and 5,595,967.

Compositions herein may also suitably include a transition metal complex of ligands such as bispidones (WO 05/042532 A1) and/or macropolycyclic rigid ligands—abbreviated as "MRLs". As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRLs include 5,12-diethyl-1,5,8,12-tetraazabicyclo[6.6.2]hexadecane.

Suitable transition metal MRLs are readily prepared by known procedures, such as taught for example in WO 00/32601, and U.S. Pat. No. 6,225,464.

Corrosion Inhibitor

According to the present invention, at least one corrosion inhibitor maybe used to prevent the corrosion of an article to be cleaned.

Preferably a silicate(s) corrosion inhibitor and more preferred a disilicate corrosion inhibitor can be used in the cleaning composition according to the present invention. The silicate(s) and/or disilicate corrosion inhibitor can be an alkali silicate and/or alkali disilicate.

Other inhibitors that can be used can be selected from the group comprising calcium acetate, calcium chloride, calcium gluconate, calcium phosphate, calcium borate, calcium carbonate, calcium citrate, calcium lactate, calcium sulfate, calcium tartrate, benzotriazole, 1,2,3-benzotriazole and mixtures thereof.

More preferred, the corrosion inhibitor is a heterocyclic compound, a triazole derivate, such as a benzotriazole or 1,2,3-benzotriazole and mixtures thereof.

However, other corrosion inhibitors can be suitable added to the cleaning composition of this invention include magnesium and/or zinc ions and Ca (N02) 2. Preferably, the metal ions are provided in water-soluble form.

Examples of useful water-soluble forms of magnesium and zinc ions are the water-soluble salts thereof including the chlorides, nitrates and sulfates of the respective metals. If any of the alkalinity providing agents are the alkali metal carbonates, bicarbonates or mixtures of such agents, magnesium oxide can be used to provide the Mg ion. The magnesium oxide is water soluble and is a preferred source of Mg ions. In order to maintain the dispersibility of the magnesium and/or zinc corrosion inhibitors in aqueous solution, and in the presence of agents which would otherwise cause precipitation of the zinc or magnesium ions, e.g., carbonates, etc., it might be advantageous to include a carboxylated polymer to the solution.

The useful carboxylated polymer corrosion inhibitors may be generically categorized as water-soluble carboxylic acid polymers such as polyacrylic and polymethacrylic acids or vinyl addition polymers, in addition to the acid-substituted polymers used in the present invention.

Of the vinyl addition polymer corrosion inhibitors contemplated, maleic anhydride copolymers as with vinyl acetate, styrene, ethylene, isobutylene, acrylic acid and vinyl ethers are examples.

The polymers tend to be water-soluble or at least colloidally dispersible in water. The molecular weight of these polymers may vary over a broad range although it is preferred to use polymers having average molecular weights ranging between about 1,000 up to about 1,000,000. These polymers have a molecular weight of about 100,000 or less and between about 1,000 and about 10,000.

The polymers or copolymers (either the acid-substituted polymers or other added polymers) may be prepared by either addition or hydrolytic techniques. Thus, maleic anhydride copolymers are prepared by the addition polymerization of maleic anhydride and another comonomer such as styrene.

The low molecular weight acrylic acid polymer corrosion inhibitors may be prepared by addition polymerization of acrylic acid or its salts either with itself or other vinyl comonomers.

Alternatively, such polymers may be prepared by the alkaline hydrolysis of low molecular weight acrylonitrile homopolymers or copolymers.

The polymers may be nonionic, anionic, cationic or amphoteric.

According to a more preferred embodiment of the present invention the cleaning composition may comprises of at least one corrosion inhibitor selected from the group comprising silicate, sodium silicate, sodium disilicate, calcium acetate, calcium chloride, calcium gluconate, calcium phosphate, calcium borate, calcium carbonate, calcium citrate, calcium lactate, calcium sulfate, calcium tartrate, benzotriazole, 1,2,3-benzotriazole, or any combination thereof, more preferred at least one benzotriazole, and most preferred at least one 1,2,3-benzotriazole.

According to the invention, the cleaning composition, preferably in form of a concentrate, may comprise about 0 wt.-% to about 4 wt.-%, preferably about 0.001 wt.-% to about 2 wt.-%, more preferred about 0.01 wt.-% to about 1 wt.-%, and most preferred of about 0.1 wt.-% to about 0.5 wt.-% of at least one corrosion inhibitor, preferably benzotriazole, and most preferred at least one corrosion inhibitor, preferably benzotriazole, and most preferred 1,2,3-benzotriazole; based on the total weight amount of the cleaning composition of the invention, preferably in form of a concentrate.

A diluted cleaning composition of the invention may comprise about 0 wt.-% to about 1 wt.-%, preferably about 0.00001 wt.-% to about 0.5 wt.-%, more preferred about 0.00005 wt.-% to about 0.5 wt.-%, and most preferred of about 0.0001 wt.-% to about 0.5 wt.-% of at least one corrosion inhibitor, preferably benzotriazole, and most preferred 1,2,3-benzotriazole; based on the total weight amount of the diluted cleaning composition of the invention.

It should be understood that the cleaning composition of the invention can be preferably free of a corrosion inhibitor.

Thickening or Gelling Agents

The compositions of the present invention can include any of a variety of known thickeners. Suitable thickeners include natural gums such as xanthan gum, guar gum, or other gums from plant mucilage; polysaccharide based thickeners, such as alginates, starches, and cellulosic polymers (e.g., carboxymethyl cellulose); polyacrylates thickeners; and hydrocolloid thickeners, such as pectin. In an embodiment, the thickener does not leave contaminating residue on the surface of an object. For example, the thickeners or gelling agents can be compatible with food or other sensitive products in contact areas. Generally, the concentration of thickener employed in the present compositions or methods will be dictated by the desired viscosity within the final composition. However, as a general guideline, the viscosity of thickener within the present composition ranges from about 0.1 wt-% to about 5 wt-%, from about 0.1 wt-% to about 1.0 wt-%, or from about 0.1 wt-% to about 0.5 wt-%.

Solidification Agent

The present compositions can include a solidification agent, which can participate in maintaining the compositions in a solid form. In some embodiments, the solidification agent can form and/or maintain the composition as a solid. The solidification agent can include, for example, an organic or inorganic solid compound having a neutral inert character or making a functional, stabilizing or detersive contribution to the present composition. Suitable solidification agents include solid polyethylene glycol (PEG), solid polypropylene glycol, solid EO/PO block copolymer, amide, urea (also known as carbamide), nonionic surfactant (which can be employed with a coupler), anionic surfactant, starch that has been made water-soluble (e.g., through an acid or alkaline treatment process), cellulose that has been made water-soluble, inorganic agent, poly(maleic anhydride/methyl vinyl ether), polymethacrylic acid, other generally functional or inert materials with high melting points, mixtures thereof, and the like. Suitable glycol solidification agents include a solid polyethylene glycol or a solid polypropylene glycol, which can, for example, have molecular weight of about 1,400 to about 30,000. In certain embodiments, the solidification agent includes or is solid PEG, for example PEG 1500 up to PEG 20,000. In certain embodiments, the PEG includes PEG 1450, PEG 3350, PEG 4500, PEG 8000, PEG 20,000, and the like. Suitable solid polyethylene glycols are commercially available from Union Carbide under the tradename CARBOWAX.

Suitable amide solidification agents include stearic monoethanolamide, lauric diethanolamide, stearic diethanolamide, stearic monoethanol amide, cocodiethylene amide, an alkylamide, mixtures thereof, and the like. In an embodiment, the present composition can include glycol (e.g., PEG) and amide.

Suitable nonionic surfactant solidification agents include nonylphenol ethoxylate, linear alkyl alcohol ethoxylate, ethylene oxide/propylene oxide block copolymer, mixtures thereof, or the like. Suitable ethylene oxide/propylene oxide block copolymers include those sold under the Pluronic tradename (e.g., Pluronic 108 and Pluronic F68) and commercially available from BASF Corporation. In some embodiments, the nonionic surfactant can be selected to be solid at room temperature or the temperature at which the composition will be stored or used. In other embodiments, the nonionic surfactant can be selected to have reduced aqueous solubility in combination with the coupling agent. Suitable couplers that can be employed with the nonionic surfactant solidification agent include propylene glycol, polyethylene glycol, mixtures thereof, or the like.

Suitable anionic surfactant solidification agents include linear alkyl benzene sulfonate, alcohol sulfate, alcohol ether sulfate, alpha olefin sulfonate, mixtures thereof, and the like. In an embodiment, the anionic surfactant solidification agent is or includes linear alkyl benzene sulfonate. In an embodiment, the anionic surfactant can be selected to be solid at room temperature or the temperature at which the composition will be stored or used.

Suitable inorganic solidification agents include phosphate salt (e.g., alkali metal phosphate), sulfate salt (e.g., magnesium sulfate, sodium sulfate or sodium bisulfate), acetate salt (e.g., anhydrous sodium acetate), Borates (e.g., sodium borate), Silicates (e.g., the precipitated or fumed forms (e.g., Sipernat 50® available from Degussa), carbonate salt (e.g., calcium carbonate or carbonate hydrate), other known hydratable compounds, mixtures thereof, and the like. In an embodiment, the inorganic solidification agent can include organic phosphonate compound and carbonate salt, such as an E-Form composition.

In some embodiments, the compositions of the present invention can include any agent or combination of agents that provide a requisite degree of solidification and aqueous solubility can be included in the present compositions. In other embodiments, increasing the concentration of the solidification agent in the present composition can tend to increase the hardness of the composition. In yet other embodiments, decreasing the concentration of solidification agent can tend to loosen or soften the concentrate composition.

In some embodiments, the solidification agent can include any organic or inorganic compound that imparts a solid character to and/or controls the soluble character of the present composition, for example, when placed in an aqueous environment. For example, a solidifying agent can provide controlled dispensing if it has greater aqueous solubility compared to other ingredients in the composition. Urea can be one such solidification agent. By way of further example, for systems that can benefit from less aqueous solubility or a slower rate of dissolution, an organic nonionic or amide hardening agent may be appropriate.

In some embodiments, the compositions of the present invention can include a solidification agent that provides for convenient processing or manufacture of the present composition. For example, the solidification agent can be selected to form a composition that can harden to a solid form under ambient temperatures of about 30 to about 50° C. after mixing ceases and the mixture is dispensed from the mixing system, within about 1 minute to about 3 hours, or about 2 minutes to about 2 hours, or about 5 minutes to about 1 hour.

The compositions of the present invention can include solidification agent at any effective amount. The amount of solidification agent included in the present composition can vary according to the type of composition, the ingredients of the composition, the intended use of the composition, the quantity of dispensing solution applied to the solid composition over time during use, the temperature of the dispensing solution, the hardness of the dispensing solution, the physical size of the solid composition, the concentration of the other ingredients, the concentration of the cleaning agent in the composition, and other like factors. Suitable amounts can include about 1 to about 99 wt-%, about 1.5 to about 85 wt-%, about 2 to about 80 wt-%, about 10 to about 45 wt-%, about 15% to about 40 wt-%, about 20% to about 30 wt-%, about 30% to about 70%, about 40% to about 60%, up to about 50 wt-%, about 40% to about 50%.

Biocide

The composition may further comprise a biocide. Any biocide suitable in oil refining operations may be used. A biocide may be included in a composition in an amount of about 0.1 ppm to about 1000 ppm. Suitable biocides include, but are not limited to, oxidizing and non-oxidizing biocides. Suitable non-oxidizing biocides include, for example amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

Solvents

The compositions of the invention may comprise one or more organic solvents, but preferably are organic solvent free. Suitable solvents include, but are not limited to, alcohols, ethanol, isopropanol, 2-butoxy ethanol, 1-decanol, benzyl alcohol, glycerin, glycols, ethylene glycol, diethylene glycol, butoxy diglycol, triethylene glycol, tetraethylene glycol, glycerin, propylene glycol, dipropylene glycol, hexylene glycol, glycol ethers, esters, or combinations thereof. Suitable alcohols include, but are not limited to, ethanol, isopropanol, 2-butoxy ethanol, 1-decanol, glycerin, or any combination thereof. Alkylene glycols having from about 2 to 6 carbon atoms, straight or branched chain lower alkyl alcohols, glycerol, propylene carbonate, alkylene glycol mono alkyl ethers where the alkylene portion has from about 2 to 6 carbon atoms and the alkyl portion has about 1 to 6 carbon atoms, poly alkylene glycol mono alkyl ethers where each alkylene portion has from about 2 to 6 carbon atoms and the alkyl portion has about 1 to 6 carbon atoms, alkyl acetates where the alkyl portion has from about 1 to 6 carbon atoms, pine oil, terpenes and mixtures thereof. Examples of such solvents are the following: Dodecane, Propylene Carbonate, Toluene Ethylene glycol monoethyl ether Naphthalene Diethylene glycol mono-n-butyl ether, Isopropyl Alcohol, Butyl acetate, Glycerol, Pine Oil Hexylene Glycol, Orange.Orange oil, d-limonene or other fragrance ingredients may be present at low levels.

According to the invention, the cleaning composition, preferably in form of a concentrate, may comprises from about 0.2%, to about 20%, preferably from about 1% to about 15%, more preferably from about 2% to about 10%.

Acid Source

An acid may be provided to adjust the pH of the solution. Organic acids such as lactic, citric, hydroxyacetic, succinic may be used. Alternately inorganic acids such as sulfuric, sulfamic and hydrochloric may be used. Depending on the acid it may also contribute other benefits to the formula, such as divalent metal sequesteration.

Form and Use of the Compositions

The cleaning compositions of the present invention may be of any suitable form, including paste, liquid, solid (such as tablets, powder/granules), foam or gel.

Solid forms include, for example, in the form of a tablet, rod, ball or lozenge. The composition may be a particulate form, loose or pressed to shape or may be formed by injection moulding or by casting or by extrusion. The composition may be encased in a water soluble wrapping, for, example of PVOH or a cellulosic material. The solid product may be provided as a portioned product as desired.

The composition may also be in paste, gel or liquid form, including unit dose (portioned products) products. Examples include a paste, gel or liquid product at least partially surrounded by, and preferably substantially enclosed in a water-soluble coating, such as a polyvinyl alcohol package. This package may for instance take the form of a capsule, a pouch or a molded casing (such as an injection molded casing) etc. Preferably the composition is substantially surrounded by such a package, most preferably totally surrounded by such a package. Any such package may contain one or more product formats as referred to herein and the package may contain one or more compartments as desired, for example two, three or four compartments.

If the composition is a foam, a liquid or a gel it is non-aqueous although other liquid solvents or carriers may be present. If the compositions are in the form of a viscous liquid or gel they preferably have a viscosity of at least 50 mPas when measured with a Brookfield RV Viscometer at 25° C. with Spindle 1 at 30 rpm.

If the composition is in the form of a foam, liquid or gel then it may be applied to by any additional suitable means into the dishwashing machine, for example by a trigger spray, squeeze bottle or an aerosol.

Methods of Using the Composition

The compositions are traditionally applied to a surface which contains the organic oil to be removed to allow the amines to suspend the soils and then the amines and suspended soil are removed. This can be by rinsing with a solvent or the solvent can be within the composition itself. The composition may, in some instances be removed with water by flushing or spraying. In some instances the amine may be removed by wiping. In a preferred embodiment the composition and methods are used for clean in place (CIP) protocols. CIP cleaning techniques are a specific cleaning regimen adapted for removing soils from the internal components of tanks, lines, pumps and other process equipment used for processing typically liquid product streams such as beverages, milk, juices, etc. CIP cleaning involves passing cleaning solutions through the system without dismantling any system components. The minimum CIP technique involves passing the cleaning solution through the equipment and then resuming normal processing. Any product contaminated by cleaner residue can be discarded. Often CIP methods involve a first rinse, the application of the cleaning solutions, a second rinse with potable water followed by resumed operations. The process can also include any other contacting step in which a rinse, acidic or basic functional fluid, solvent or other cleaning component such as hot water, cold water, etc. can be contacted with the equipment at any step during the process.

Processes of Making Cleaning Compositions

The compositions of the invention may be made by any suitable method depending upon their format. Suitable manufacturing methods for cleaning composition compositions are well known in the art, non-limiting examples of which are described in U.S. Pat. Nos. 5,879,584; 5,691,297; 5,574,005; 5,569,645; 5,565,422; 5,516,448; 5,489,392; and 5,486,303. Various techniques for forming cleaning compositions in solid forms are also well known in the art, for example, cleaning tablets may be made by compacting granular/particular material and may be used herein.

In one aspect, the liquid cleaning composition compositions disclosed herein may be prepared by combining the components thereof in any convenient order and by mixing, e.g., agitating, the resulting component combination to form a phase stable liquid cleaning composition. In one aspect, a liquid matrix is formed containing at least a major proportion, or even substantially all, of the liquid components, with the liquid components being thoroughly admixed by imparting shear agitation to this liquid combination. For example, rapid stirring with a mechanical stirrer may usefully be employed. While shear agitation is maintained, substantially all of any solid ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills are incorporated. As a variation of the composition preparation procedure described above, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

Those skilled in the art will recognize, or be able to ascertain using no more than routine experimentation, numerous equivalents to the specific procedures, embodiments, claims, and examples described herein. Such equivalents are considered to be within the scope of this invention and covered by the claims appended hereto. The contents of all references, patents, and patent applications cited throughout this application are hereby incorporated by reference to the same extent as if each individual publication or patent application was specifically and individually indicated as incorporated by reference. All publications and patent applications in this specification are indicative of the level of ordinary skill in the art to which this invention pertains. The invention is further illustrated by the following examples, which should not be construed as further limiting.

EXAMPLES

Over 130 different chemistries were tested for their solubility, adhering ability, redeposition potential and impact on soil removal in combination with fatty acid methyl esters. The results are shown in Table A below:

TABLE A

| Chemistry | Group | Soluble at 25% in FAME? | Lower adhering | Prevent redep | Soil impact |
|---|---|---|---|---|---|
| 1,3 Dioxolane | acetal | | | | |
| C10-25 Dimethyl acetamide | acetamide | yes | no | no | no |
| 1-butanol | alcohol | | | | |
| 1-propanol | alcohol | | | | |
| 3-methoxy 3-methyl butanol | alcohol | yes | no | no | no |
| Benzyl alcohol | alcohol | yes | no | yes | no |
| ethanol | alcohol | yes | yes | yes | no |
| Isoamyl alcohol (isopentyl alcohol) | alcohol | | | | |
| Isobutanol | alcohol | | | | |
| isopropanol | alcohol | | | | |
| methanol | alcohol | | | | |
| pentanol | alcohol | | | | |
| hexane | alkane | | | | |
| isooctane | alkane | | | | |
| kerosene | alkane | yes | yes | no | no |
| naphtha (Aromatic 200) | alkane | yes | yes | no | no |

TABLE A-continued

| Chemistry | Group | Soluble at 25% in FAME? | Lower adhering | Prevent redep | Soil impact |
|---|---|---|---|---|---|
| n-heptane | alkane | yes | yes | no | no |
| Alkyl benzyl sulfonate | anionic surfactant | yes | no | no | no |
| lauryl ether sulfate | anionic surfactant | | | | |
| Cocamidopropyl Betaine | betaine | | | | |
| GLDA | chelator | | | | |
| MGDA | chelator | | | | |
| Melamine | cyanamide | | | | |
| 2-Methyltetrahydrofuran (2MeTHF) | ether | | | | |
| anisole (methoxybenzene) | ether | | | | |
| Cyclopentyl Methyl Ether (CPME) | ether | | | | |
| Cyclopentyl Methyl Ether (CPME) | ether | | | | |
| dimethoxyethane | ether | | | | |
| Dipropylene Glycol n-Butyl Ether DPnB | ether | yes | no | no | no |
| dipropylene glycol phenol ether | ether | yes | no | no | no |
| Dowanol EpH Ethylene glycol phenyl ether | ether | | | | |
| Ethylene Glycol Monobutyl Ether | ether | | | | |
| PEG 1000 | ether | | | | |
| propylene Glycol Methyl Ether | ether | | | | |
| Tetrahydrofuran | ether | | | | |
| Tripropylene Glycol n-Butyl Ether) | ether | | | | |
| acetic acid | fatty acid | | | | |
| nonanoic | fatty acid | yes | no | no | no |
| oleic acid | fatty acid | | | | |
| propanoic acid | fatty acid | | | | |
| 2,2,4-trimethyl-1,3-pentanediol monoisobutyrate | fatty acid ester | | | | |
| 2-ethylhexyl acetate | fatty acid ester | | | | |
| B100 biodiesel | fatty acid ester | yes | no | no | no |
| Butyl 3-hydroxybutyrate | fatty acid ester | yes | yes | no | no |
| caprylic diacetate | fatty acid ester | | | | |
| diethylene glycol butyl ether acetate | fatty acid ester | | | | |
| dimethyl 2 methyl glutarate (This is a microemulsion, so probably not useful) | fatty acid ester | yes | no | no | no |
| dimethyl methyl glutarate | fatty acid ester | | | | |
| EEP = ethyl 3-ethoxy propionate | fatty acid ester | | | | |
| Ethyl 3-Ethoxypropionate | fatty acid ester | | | | |
| ethyl acetate | fatty acid ester | | | | |
| ethyl benzoate | fatty acid ester | yes | yes | no | no |
| ethyl butarate | fatty acid ester | yes | no | no | no |
| ethyl lactate (Lactic acid ethyl ester) | fatty acid ester | | | | |
| ethyl octonate | fatty acid ester | | | | |
| ethylene glycol butyl glycol ether acetate | fatty acid ester | | | | |
| isobutyl acetate | fatty acid ester | | | | |
| Isobutyl Isobutyrate | fatty acid ester | yes | yes | no | no |
| isopropyl acetate | fatty acid ester | | | | |
| methyl acetate | fatty acid ester | | | | |
| methyl caprylate | fatty acid ester | | | | |
| n-butyl acetate | fatty acid ester | | | | |
| n-pentyl propionate | fatty acid ester | | | | |
| n-propyl acetate | fatty acid ester | | | | |

TABLE A-continued

| Chemistry | Group | Soluble at 25% in FAME? | Lower adhering | Prevent redep | Soil impact |
|---|---|---|---|---|---|
| propylene glycol diacetate | fatty acid ester | | | | |
| Propylene Glycol Monomethyl Ether Acetate | fatty acid ester | | | | |
| 1,2 propanediamine | fatty amine | | | | |
| 2-(2-Aminoethoxy)ethanol | fatty amine | | | | |
| 2-Ethylhexylamine | fatty amine | yes | | | no |
| ammonia | fatty amine | | | | |
| AMP 95 2-amino 2-methyl propanol | fatty amine | no | | | |
| butyl amine | fatty amine | yes | no | no | yes |
| Cocamide DEA (Schercomid CDO) | fatty amine | yes | no | no | no |
| Diethanolamine | fatty amine | no | | | |
| Diglycolamine | fatty amine | no | | | |
| dimethyl formamide | fatty amine | | | | |
| DIPROPYLAMINE | fatty amine | | | | |
| Dipropylamine Tetraamine | fatty amine | | | | |
| dodecyl amine | fatty amine | yes | | | yes |
| ethylene diamine | fatty amine | | | | |
| hexyloxypropylamine | fatty amine | yes | yes | no | no |
| imidazol | fatty amine | no | | | |
| Monoethanolamine | fatty amine | | | | |
| monoisopropyl amine | fatty amine | no | | | |
| MOPA, methoxypropylamine | fatty amine | | | | |
| morpholine | fatty amine | | | | |
| N,N-DIMETHYL 9-DECENAMIDE | fatty amine | | | | |
| N-Methyl-pyrrolidone | fatty amine | | | | |
| Octamethylenediamine | fatty amine | | | | |
| octylamine | fatty amine | yes | | | yes |
| ortho-phenolenediamine | fatty amine | | | | |
| PPD para-phenolenediamine | fatty amine | | | | |
| tetramethylethylenediamine | fatty amine | | | | |
| Tridecylamine | fatty amine | yes | | | no |
| Triethanolamine | fatty amine | no | | | |
| acetone | ketone/aldehyde | yes | no | no | no |
| isobutyl heptyl ketone | ketone/aldehyde | | | | |
| methyl ethyl ketone | ketone/aldehyde | | | | |
| decyl 4 ethoxylate phosphate ester | phosphate ester | | | | |
| diester PEGs | polymer | | | | |
| Linear polyethylenimine | polymer | | | | |
| Mixture of aliphatic dicarboxylic acids | polymer | | | | |
| ethylene glycol | polyol | | | | |
| glycerine | polyol | | | | |
| hexyl glycol | polyol | yes | no | no | no |
| propylene glycol | polyol | | | | |
| tall oil | resin | yes | no | no | no |
| Aromatic 200 | solvent | | | | |
| naphthalene | solvent | | | | |
| 25-3 | surfactant | yes | yes | yes | no |
| 25-5 | surfactant | yes | no | yes | no |
| 25-7 | surfactant | no | no | yes | no |
| 25-7 (3%) | surfactant | yes | no | yes | no |
| alkyl poly glucoside | surfactant | no | | | |
| C10/12 3EO (Dehydol OD5) | surfactant | | | | |
| guerbet alcohol ethoxylate (3EO) | surfactant | | | | |
| NPE 9 | surfactant | yes | no | no | no |
| Pernil ME 610 | surfactant | | | | |
| short linear nonionic (Lutensol CS6250) | surfactant | | | | |
| sorbitan ester | surfactant | | | | |
| limonene | terpene | yes | no | no | no |
| mineral spirits | terpene | yes | yes | no | no |
| pine oil | terpene | | | | |
| turpene hydrate | terpene | | | | |
| turpentine | terpene | | | | |
| N,N'-Demethylpropyleneurea (DMPU) | urea | | | | |
| urea | urea | | | | |
| 1-Phenylethylamine | | | | | |
| 2,2'-Dipyridylamine | | | | | |
| Aminopyridine | | | | | |
| benzyl triazole | | | | | |
| cocodiamine | | | | | |
| hexalactam | | | | | |
| Phenethylamine | | | | | |
| Tyramine (4-hydroxyphenethylamine | | | | | |

Equipment 50 mL glass vial

Oven for heating samples up to 125 C

Procedure

A soil sample was be selected of about 1% of the total test material—often 0.5 grams. This is added to the vial. Fill the vial about half way with the solvent (often water) that will comprise the continuous phase of the cleaning test. Add whatever additional chemicals are to be tested. Fill the remainder of the vial with the solvent, leaving some head space for expansion, foaming, and to have a clear view of the surface of the liquid. Depending on the test, some agitation may be used.

If it is desired to understand the impact of temperature on the process, the sample may be brought up to an elevated temperature (with an eye on safety). Typically, there are several steps during which the interaction with the soil is observed and recorded.

Results

The aspects of performance are open to the experimenter to determine. Often soil dispersion, soil dissolution, soil adherence to the container, additive and solvent interactions, evidence of reactions are all recorded. In addition the appearance and miscibility of the additives and solvent are recorded. These may all be recorded repeatedly during the test.

Figure 2:
FIG. 2 is a scanning electron micrograph of soil after cleaning with the composition of the invention.

FIG. 1 is a scanning electron micrograph of soil before cleaning. FIG. 2 is a scanning electron micrograph after cleaning with 25% dodecyl amines in FAME (composition A below). There was no rinsing after cleaning and the micrographs clearly show destruction of the soil itself Sample formulations

| | A | B | C | D |
|---|---|---|---|---|
| dodecyl amine | 25% | 10% | 0% | 0% |
| butyl amine | 0% | 0% | 25% | 0% |
| octylamine | 0% | 0% | 0% | 25% |
| fatty acid methyl ester | 75% | 90% | 75% | 75% |

What is claimed is:

1. A non-aqueous pretreatment composition for removal of heat-adhered soils comprising;

one or more primary alkyl amines;

an ester solvent; and wherein the composition does not include water or a polycarboxylate.

2. The composition of claim 1, wherein the alkyl amine is a primary fatty amine.

3. The composition of claim 1, wherein the alkyl amine is a linear primary fatty amine.

4. The composition of claim 1, wherein the alkyl amine is a linear primary alkyl amine with a $C_1$ or higher alkyl chain length.

5. The composition of claim 1, further comprising a second alkyl amine.

6. The composition of claim 5, wherein the second alkyl amine is a branched fatty amine.

7. The composition of claim 6, wherein the branched fatty amine is a 2-ethyl hexyl amine.

8. The composition of claim 1, wherein the ester solvent is a fatty acid ester solvent.

9. The composition of claim 8, wherein the fatty acid ester solvent is a fatty acid methyl ester.

10. The composition of claim 1, wherein the alkyl amine is dodecyl amine, butyl amine, octylamine, or a combination thereof.

11. The composition of claim 1, wherein the ester solvent is saturated or unsaturated and a $C_4$-$C_{18}$ carbon chain.

12. The composition of claim 1, wherein the ester solvent is present in an amount of form about 50 wt. % to about 98 wt. %.

13. The composition of claim 1, where the one or more alkyl amines is present in an amount of from about 2 wt. % to about 40 wt. %.

14. The composition of claim 1, wherein the composition does not include an alkanolamine.

15. The composition of claim 1, wherein the one or more alkyl amines do not have a hydroxyl functional group.

16. The composition of claim 1, further comprising one or more of a surfactant, builder, chelating agent, viscosity modifier, dispersant, enzyme, enzyme stabilizer, catalytic material, bleach, bleach activator, hydrogen peroxide, threshold inhibitor, pigment, dye, perfume, elasticizing agent, hydrotrope, processing aid, additional solvent, pH buffer, cleaning composition, or a combination thereof.

17. The composition of claim 1, wherein the composition removes heat-adhered soils from a distillation tower, cleaning oven, food cooking surface, or dry cleaning surface.

* * * * *